May 6, 1969

T. N. THIELE 3,443,120

PULSE GENERATING SYSTEM FOR GATING SILICON CONTROLLED RECTIFIERS

Filed July 1, 1965

Inventor
Tom N. Thiele
By W. J. Robertson
Attorney

United States Patent Office 3,443,120
Patented May 6, 1969

3,443,120
PULSE GENERATING SYSTEM FOR GATING
SILICON CONTROLLED RECTIFIERS
Tom N. Thiele, Oconomowoc, Wis., assignor to Allis-Chalmers Manufacturing Company, Milwaukee, Wis.
Continuation-in-part of application Ser. No. 114,260, June 1, 1961. This application July 1, 1965, Ser. No. 473,889
Int. Cl. H03k 3/64, 3/26
U.S. Cl. 307—106          15 Claims

ABSTRACT OF THE DISCLOSURE

A circuit for gating a controlled rectifier at a preselected point in each half cycle to control the power delivered by the rectifier to an electrical load includes a full wave rectifier for generating unidirecional pulses, a capacitor, switching transistor means responsive to the current zero between pulses for connecting the capacitor to a power source, variable impedance means including the emitter-collector circuit of a transistor for discharging the capacitor at a selected rate, monostable pulse forming transistor means for switching from a stable to an unstable state in response to a predetermined level of charge on the capacitor and for changing back to the stable state when the capacitor has discharged to a second predetermined level, and differentiating means responsive to the change of the monostable means from the unstable to the stable state to produce a gating pulse for the controlled rectifier.

---

Figure 1:
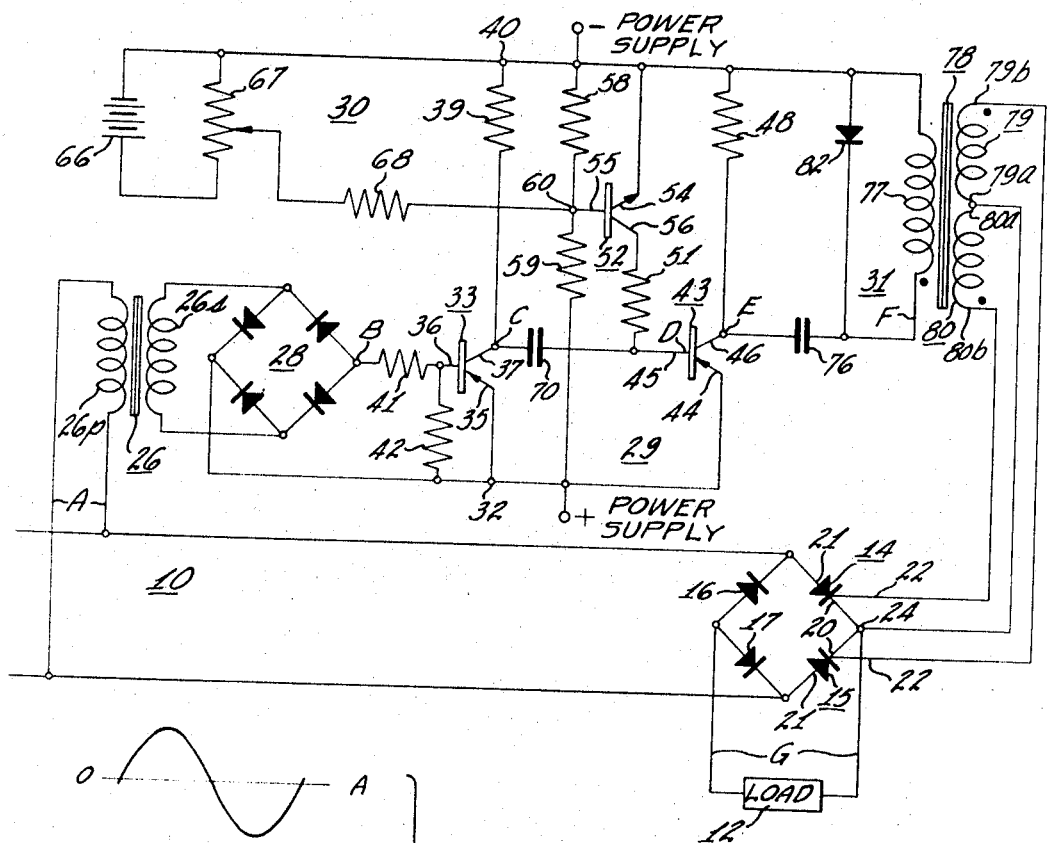

This invention relates to semiconductor control circuits. More specifically, this invention relates to an improved semiconductor circuit that produces a pulse having a selectable time relation to an input reference signal such as the pulses of a rectified alternating current.

This application is a continuation-in-part of my application Ser. No. 114,260 filed June 1, 1961, now abandoned.

The circuit disclosed is an embodiment of this invention intended to produce a series of pulses that gate a semiconductor controlled rectifier on half cycles in an alternating current system to control the current to a load. In this function the circuit of this invention is a semiconductor counterpart of numerous well known prior art circuits that control mercury vapor rectifiers, thyratrons, and similar devices. The semiconductor controlled rectifier is in many respects functionally analogous to these devices. The controlled rectifier begins to conduct between its cathode and anode terminals when it receives a gating current in the circuit of its gate and cathode terminals. The controlled rectifier then continues to conduct in its cathode-anode circuit even without a gating current so long as a minimum current flows in the cathode-anode circuit. In an alternating current system a controlled rectifier cuts off each cycle at a current zero. Supplying a gating current to the controlled rectifier at a selected time in a cycle causes the controlled rectifier to conduct until the next current zero. Controlling the timing of the gating pulse controls the period that the controlled rectifier conducts and thereby controls the power that the controlled rectifier transmits to a load. Ordinarily, at least two controlled rectifiers are connected to provide full wave power to the load. Combinations of rectifiers may be arranged to provide either an alternating current output either single phase or polyphase, or a pulsing direct current output, either single phase or polyphase, or a pulsing direct current output.

The circuit of this invention distorts the sine wave form of the system alternating voltage and produces an electrical reference signal or pulse in the neighborhood of each voltage zero in the alternating current system. The voltage zero signal switches a monostable circuit to its unstable mode. The monostable circuit returns to its stable mode at the time that is selected for the controlled rectifier to begin conducting. Each half cycle the monostable circuit switches between its stable mode and its unstable mode and produces a generally rectangular pulse. The leading edge of the rectangular pulses occur very near the voltage zeros in the alternating current system, and the trailing edge which is usually the functional output signal occurs at the time selected for the rectifier to begin conducting. A differentiating circuit is used to produce a gating pulse in response to the trailing edge of the pulse. The rate that the monostable circuit returns to its stable mode is controlled. Varying this rate lengthens or narrows the rectangular pulse that the monostable circuit produces and thereby controls the output of the controlled rectifier.

One advantage of this circuit is that the duration of the unstable mode of the monostable circuit can be varied over a wide period of time that corresponds to substantially the entire half cycle of a commercial power source or the duration can be extended beyond the half cycle period of the power source. This would prevent the controlled rectifiers from firing because each new reference pulse resets the monostable circuit to the start of its unstable condition.

Another advantage of this circuit is that is uses transistors in their switching mode and the output of the circuit is largely independent of variations in different transistor types and variations that may occur between individual transistors of the same type.

One object of this invention is to provide a new and improved circuit that provides a pulse a selected time after the receipt of an input reference signal.

Another object of this invention is to provide a new and improved circuit for controlling devices such as controlled rectifiers that operate periodically.

Another object of this invention is to provide a new and improved monostable transistor circuit with means to modulate the width of pulses produced by the circuit.

Another object of this invention is to provide a monostable circuit that always resets to the beginning of its unstable condition each time a reference pulse is received regardless of the condition of the circuit.

Other objects and advantages of this invention will appear from the drawing and from the description of the invention.

Figure 2:
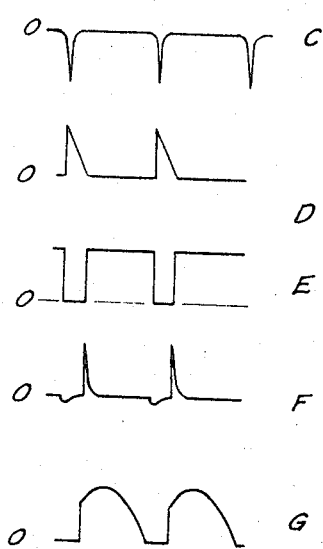

In the drawing:

FIG. 1 is a schematic drawing of the gating control circuit of this invention; and FIG. 2 is a series of wave forms, A through G, associated with various terminals of the circuit of FIG. 1.

The gating control circuit of this invention operates in an alternating current system 10, and it controls the power that the system 10 supplies to a load 12 by selectively gating two controlled rectifiers 14 and 15 that are in series with the load. In the specific circuit that FIG. 1 illustrates, the two controlled rectifiers 14, 15 cooperate with two conventional rectifiers 16 and 17 to form a full wave bridge rectifier that supplies direct current to the load 12. The controlled rectifiers 14 and 15 each have a cathode terminal 20, an anode terminal 21, and a gate terminal 22. The gate terminal and the cathode terminal are the control terminals of a controlled rectifier. A current in the circuit of the gate terminal 22 and the cathode terminal 20 gates the controlled rectifier. The controlled rectifier then begins conducting in the circuit of its cathode 20 and anode 21.

The two controlled rectifiers 14 and 15 are connected cathode to cathode to form a common potential point 24 which simplifies coupling the control terminals 20, 22 of both control rectifiers 14, 15 to the gating control circuit. The control circuit may be used with various other well-known rectifier connections. With suitable provision for separately coupling each of the gate cathode circuits to the gating control, described later, the two controlled rectifiers 14, 15 can be connected anode to cathode to supply alternating current to the load 12 or they can be connected in adjacent sides of the bridge for commutating an inductive load. Some loads may operate satisfactorily with half wave current as a single controlled rectifier would provide. A single controlled rectifier can be connected in series with a supply of rectified unfiltered direct current to control the current.

The gating control circuit of this invention supplies a gating pulse (FIG. 2F) to the controlled rectifiers 14, 15 a selected time after each voltage zero in the system 10. The gating control circuit comprises means for producing a reference signal such as a transformer 26 that provides a sinusoidal voltage (FIG. 2A) that indicates voltage zeros in the system 10, a network 28 that distorts the sine form of the system voltage signal to a form that more distinctly indicates the voltage zeros (FIG. 2B) or reference pulses, a circuit 29 that switches to an unstable mode in response to a voltage zero signal and remains in the unstable mode until a selected time later to produce a timed output signal, a control circuit 30 for the circuit 29, and a circuit 31 that forms the gating pulse in response to the output signal as the circuit 29 returns from its unstable mode.

The transformer 26 has a primary winding 26p connected to the system 10. A sinusoidal voltage shown in FIG. 2A appears across secondary windings 26s. The voltage across secondary windings 26s is either in phase with the voltage of the system 10 or 180° out of phase, and voltage zeros occur simultaneously at controlled rectifiers 14, 15 and at secondary windings 26s.

The network 28 comprises a full wave rectifier, illustrated in FIG. 1 as a bridge rectifier. The alternating current terminals of rectifier 28 are connected to the ends of secondary windings 26s of transformer 26, and the wave form of FIG. 2A appears across these terminals. The positive terminal of bridge rectifier 28 is connected to a point 32 of common positive potential in the gating control circuit. The output at the direct current terminals of rectifier 28 is unfiltered, and as FIG. 2B shows, the wave form at the negative terminal comprises a series of reference narrow positive going pulses. The peak of the pulses occur in the rectifier wave of FIG. 2B where voltage zeros occur in the system voltage of FIG. 2A, and the peaks drive circuit 29 to its unstable condition in the neighborhood of each voltage zero.

When the circuit is understood, it will be apparent that with any timing means that produces a suitable periodic signal, the control can be used in a direct current system.

Circuit 29 is a monostable circuit and includes a transistor 33 that receives the voltage zero indicating wave of FIG. 2B and operates as a switch to produce a series of narrow negative spikes as shown in FIG. 2C. Transistor 33 has an emitter terminal 35, a base terminal 36, and a collector terminal 37. Emitter terminal 35 is connected to common potential point 32 and a collector resistor 39 connects collector terminal 37 to a point 40 of negative potential. A suitable power supply maintains the desired voltage between common point 32 and negative point 40. A resistor 41 connects base terminal 36 to the negative terminal of bridge rectifier 28, and a resistor 42 connects base terminal 36 to common potential point 32. Thus, the voltage across the direct current terminals of bridge rectifier 28 appears across resistor 41 and the base emitter circuit of transistor 33 and establishes a forward biasing current that flows in the base emitter circuit of transistor 33. This current in turn controls the current in the emitter-collector circuit of transistor 33 and thereby controls the potential at collector terminal 37. Resistor 42 prevents the minority leakage carriers from the collector region from crossing the base-emitter junction.

Even though the voltage at base terminal 36 of transistor 33 is always the correct polarity to produce a forward biasing current, a significant current cannot flow in the base-emitter circuit unless the base is at least a few tenths of a volt negative with respect to the emitter. The nonlinear volt-ampere characteristic of a semiconductor junction which accounts for cutting off the base-emitter current at the zero going peaks is common to all transistors. The maximum voltage at the direct current terminals of bridge rectifier 28 is large enough so that the voltage wave shown in FIG. 2B passes through the negative cutoff potential of the base-emitter circuit very close to the voltage zeros in the alternating current system. Transistor 33 conducts in its saturated region during most of each half cycle while the base potential is in the region of the valleys in the rectified wave of FIG. 2B. Transistor 33 cuts off abruptly when the voltage of base terminal 36 is less negative than the minimum voltage required for the base-emitter circuit to conduct, and transistor 33 conducts again shortly after each voltage zero when the rectified wave of FIG. 2B becomes more negative. While transistor 33 is conducting, collector terminal 37 is very nearly at the potential of common positive point 32 (FIG. 2C). During the short time that transistor 33 cuts off, the potential at the collector terminal rises to the negative potential of power supply terminal 40.

Monostable circuit 29 also includes a transistor 43 having an emitter terminal 44, a base terminal 45, and a collector terminal 46. Emitter terminal 44 is connected to common potential point 32, and a resistor 48 connects collector terminal 46 to negative potential point 40. Transistor 43 also operates as a switch. A resistor 51 and a control transistor 52 connect base terminal 45 of transistor 43 to negative potential point 40.

Control transistor 52 has an emitter terminal 54, a base terminal 55, and a collector terminal 56. Control transistor 52 is of the opposite conductivity type (NPN) of transistor 43 (PNP), and negative potential point 40 is a common potential point for control transistor 52. Emitter terminal 54 of transistor 52 is connected to negative potential point 40. Resistor 51 and the base-emitter circuit of transistor 43 connect collector terminal 56 of transistor 52 to positive potential point 32. Thus, when the base-emitter junction of transistor 52 is forward biased, transistor 52 conducts in its emitter-collector circuit and forward biases the base-emitter junction of transistor 43. Two resistors 58 and 59 are connected between positive potential point 32 and negative potential point 40 and provide a biasing voltage at their common connection 60 for transistor 52. A common connection point 60 of resistors 58 and 59 is connected to base terminal 55, and the potential at point 60 establishes a fixed bias level for control transistor 52.

Control circuit 30 provides a signal that varies the base-emitter current of control transistor 52 and thereby controls the base-emitter current of transistor 43. FIG. 1 illustrates circuit 30 somewhat abstractly as a battery 66 and a potentiometer 67. The negative terminal of circuit 30 is connected to common negative potential point 40, and a gain limiting resistor 68 connects positive terminal 30 to connection point 60 and base terminal 55 of transistor 52. The setting of potentiometer 67 controls conduction in the circuit of emitter 54 and collector 56 of transistor 52 and thereby controls the discharge rate of a capacitor 70. Many well known controls can be used to provide a suitable signal at the terminals 40 and 60 of transistor 52. For many applications it will be desirable to combine several signals at these terminals and to feed back a measure of the voltage at load 12 to these terminals.

Capacitor 70 connects base terminals 45 of transistor 43 to collector terminal 37 of transistor 33. Transistor 33 and capacitor 70 cooperate to switch transistor 43 to its unstable nonconducting mode in the neighborhood of each voltage zero, and control transistor 52 and capacitor 70 cooperate to return transistor 43 to its stable conducting condition at a selected point determined by the discharge rate of capacitor 70 through transistor 52. During the short interval in the neighborhood of each voltage zero when transistor 33 is cut off, capacitor 70 charges in a circuit that comprises the circuit of emitter 44 and base 45 of transistor 43 in the forward direction, and collector resistor 39 of transistor 33. The capacitor terminal that is connected to collector 37 will be called the "collector terminal" and the terminal that is connected to base 45 will be called the "base terminal" of the capacitor. In the neighborhood of each voltage zero, the collector terminal (FIG. 2C) of capacitor 70 charges to the negative voltage of point 40 and the base terminal (FIG. 2D) of capacitor 70 charges only very slightly negative with respect to common potential point 32. Substantially, the entire voltage of the source appears across capacitor 70 while transistor 33 is cut off. When transistor 33 conducts immediately after a voltage zero, the emitter-collector circuit of transistor 33 connects the negatively charged collector terminal of capacitor 70 to positive common potential point 32. The positively charged base terminal of capacitor 70 is thus highly positive with respect to common point 32, and base terminal 45 of transistor 43 is correspondingly positive with respect to emitter terminal 44. So long as capacitor 70 holds this charge and transistor 33 is conducting, the voltage across capacitor 70 reverse biases the base-emitter junction of transistor 43 and prevents transistor 43 from conducting in its emitter-collector circuit. When transistor 43 cuts off, the potential at collector 46 (FIG. 2E) of transistor 43 changes abruptly from the positive potential of common point 32 to the potential of negative point 40 (the reference potential in FIG. 2E).

Control transistor 52 discharges capacitor 70 at a selected rate that causes transistor 43 to conduct again when the charge on capacitor 70 has been reduced to the required level. While transistor 33 is conducting, capacitor 70 discharges in a circuit that comprises common potential point 32, the emitter-collector circuit of transistor 33, resistor 51, the emitter-collector circuit of control transistor 52, negative potential point 40, and the power supply. Capacitor 70 discharges through control transistor 52 at a rate that corresponds to the current of the base-emitter circuit of the control transistor. The base-emitter current of control transistor 52 is controlled by control circuit 30 as has already been explained.

The circuit recharges capacitor 70 to initiate the timing function at each voltage zero even though capacitor 70 has not fully discharged. Transistor 43 will momentarily turn on when transistor 33 cuts off momentarily at each voltage zero. Collector resistor 39 connects the negatively charged collector terminal of capacitor 70 to negative potential terminal 40. The voltage across capacitor 70 is less than the voltage between the common potential points 32 and 40 and the base terminal of capacitor 70 is at least slightly negative with respect to common positive potential point 32 and emitter terminal 44.

As transistor 43 switches between its stable and unstable mode, it produces a rectangular voltage pulse at collector terminal 46. FIG. 2E illustrates this output with respect to common negative potential point 40. The negative (down) going edge of the rectangular wave occurs near voltage zero when transistor 33 begins conducting and transistor 43 cuts off. The positive going edge occurs at the selected time when transistor 43 begins conducting.

The rectangular pulse of FIG. 2E is suitable for gating the controlled rectifiers at the selected time in each half cycle. However, a controlled rectifier requires only a momentary current in its gate-cathode circuit, and it is desirable to supply only a momentary gating current in order to reduce the power that the gating circuit requires and to reduce the heating in the controlled rectifier. Differentiating circuit 31 produces a momentary gating pulse (FIG. 2F) in response to the leading edge of the pulse of FIG. 2E. A device, such as a transistor, that requires a continuous control current can be suitably controlled by the pulse of FIG. 2E as it appears across resistor 48.

Differentiating circuit 31 is connected across collector resistor 48 and receives the rectangular wave form of FIG. 2E. Differentiating circuit 31 produces a positive gating pulse (FIG. 2F) in response to the trailing edge of this rectangular wave. The differentiating circuit comprises a capacitor 76 and an impedance 77 connected in series. When transistor 43 begins conducting (the positive going edge of the wave of FIG. 2E), substantially the entire voltage of the source appears momentarily across impedance 77. This voltage decays very rapidly as capacitor 76 charges, and differentiating circuit 31 does not respond to the positive valley in the rectangular output of transistor 43. The voltage across impedance 77 gates controlled rectifiers 14 and 15.

In the specific circuit of FIG. 1 impedance 77 comprises the primary winding of a transformer 78 and the circuit elements that are coupled to the primary winding. Transformer 78 has two secondary windings 79 and 80. Secondary winding 79 supplies a positive gating pulse to controlled rectifier 15 on alternate half cycles, and secondary winding 80 supplies a positive gating pulse to controlled rectifier 14 on the intervening half cycles. In the controlled rectifier array of FIG. 1, cathode terminals 20 of controlled rectifiers 14, 15 are connected to a common point 24, and like polarity ends 79a and 80a of each secondary winding are connected to point 24. The other end 79b and 80b of each secondary winding is connected to the gate terminal 22 of one of the two controlled rectifiers 14 and 15. Because transforer 78 has two separate secondary windings 79 and 80, the gating control circuit of FIG. 1 can be easily connected to control rectifiers that do not have a common cathode connection.

Differentiating circuit 31 also includes a diode 82 that tends to prevent differentiating circuit 31 from producing a negative pulse at each voltage zero. As FIG. 2F shows, differentiating circuit 31 produces a small negative voltage at each voltage zero in contrast to the sharp positive spikes that gate the controlled rectifiers. Diode 82 is important when the control is set for maximum rectifier output. At maximum output the positive gating pulse occurs very near voltage zero. A negative pulse at voltage zeros would prevent gating the controlled rectifiers 14 very near voltage zero as is necessary to provide maximum power to the load 12. A negative pulse does not influence controlled rectifiers 14 and 15, and the gating control circuit operates satisfactorily, in a reduced control range, without means to suppress the negative pulse.

Diode 82 is connected across primary winding 77 of transformer 78 and is polarized opposite to transistor 43. When transistor 43 conducts, the high back impedance of diode 82 as compared with the impedance of parallel winding 77 prevents diode 82 from influencing the circuit. Capacitor 76 charges through winding 77 and the emitter-collector circuit of transistor 43, and the positive pulse voltage shown in FIG. 2F appears across winding 77. When transistor 43 cuts off at voltage zero, capacitor 76 discharges in a circuit that comprises collector resistor 48 and the parallel combination of diode 82 and winding 77. The low forward impedance of diode 82 in comparison with the impedance of winding 77 discharges capacitor 76 rapidly so that the charges on the capacitor does not reduce the height of the next positive gating pulse. Since diode 82 in its forward direction has a considerably lower impedance than collector resistor 48, substantially all of the capacitor discharge voltage appears across collector resistor 48 and only a small negative voltage appears across winding 77.

The polarity of the voltage across output windings 79 and 80 depends on the connection of the terminals of these windings, and this polarity is independent of the polarities of other parts of the gating control circuit. The polarity of the gating pulse (FIG. 2F) can be reversed by reversing the terminals of either winding 77 or both windings 79 and 80. The polarity types of transistors 33, 43, and 52 may be reversed, if desired, by reversing the polarity of the power supply and voltage zero indicating network 28.

FIG. 2G shows the voltage across load 12. The voltage of system 10 appears across the load only while one of controlled rectifiers 14 or 15 is conducting and thus the power to load 12 varies with the width of the pulse of FIG. 2E. The width of the pulse of FIG. 2E can be varied over substantially an entire half cycle and the circuit provides a wide range of control for load 12.

In describing the invention, the preferred embodiment has been shown and described, but it is obvious to one skilled in the art that there are many variations, combinations, alterations and modifications that may be made without departing from the spirit of the invention, or from the scope of the appended claims.

The embodiments of the invention in which an exclusive property or privilege is claimed are defined as follows:

1. Means for producing an output signal a preselected time after a reference pulse received as an input, said means comprising:
   an electrical energy storage device;
   means responsive to the reference pulse to change the storage device to a first preselected level;
   means connected to the storage device for discharging the storage device at a preselected rate;
   monostable switching means having stable and unstable operating modes and including said storage device and a single transistor and responsive to the level of charge of the storage device to change from the stable to the unstable mode when the storage device is charged to said first preselected level and to change from said unstable mode to said stable mode when said storage device has discharged to a second preselected level less than the first preselected level; and
   means responsive to the change of said monostable switching means from its unstable mode to its stable mode to produce an output pulse.

2. Means for producing an output signal a preselected time after each voltage zero in an alternating current system, said means comprising:
   a full wave rectifier having its alternating current terminals coupled to said alternating current system for generating unidirectional pulses;
   a capacitance;
   switching means having an output circuit connected to a power source and to the capacitance and receiving said pulses as an input and being maintained in a conducting state by said pulses and being operable to a nonconducting state by each voltage zero between said pulses to momentarly connect the capacitance to the power source to charge the capacitance to a first preselected level;
   variable resistance means for discharging the capacitance at a preselected rate; and
   pulse generating means responsive to the level of charge on the capacitance to produce an output signal when the capacitance has discharged to a second preselected level less than the first preselected level.

3. Means for producing an output pulse a preselected time after a reference pulse received as an input, said means comprising:
   a capacitance;
   first transistor switch means having an output circuit connected to a power source and to the capacitance and having an input circuit receiving said reference pulse and being responsive to each reference pulse to momentarily connect the capacitance to the power source to charge the capacitance to a first preselected level;
   variable resistance means for discharging the capacitance at a preselected rate; and
   a second transistor switch connected to be responsive to the level of charge on the capacitance and having one output condition when the storage device is charged to said first preselected level and having a second output condition when said storage device has discharged to a second preselected level less than the first preselected level; and
   means responsive to the output condition of the second transistor switch to produce an output pulse.

4. An electrical control system comprising:
   means for producing periodic reference pulses having a varying duration between pulses;
   a power source;
   an electrical energy storage device;
   means connected to the storage device for discharging the storage device at a preselected rate;
   means connected to receive the reference pulses and responsive to each reference pulse regardless of the duration between pulses to charge the storage device to a first preselected level;
   monostable switching means including said storage device and a single transistor responsive to the level of charge of the storage device to drive it from its stable to its unstable operating mode when the storage device is charged to the first preselected level and to change from its unstable mode to its stable mode when said storage device has discharged to a second preselected level; and
   means responsive to the change of the monostable switching means from its unstable to its stable operating mode to produce an output pulse.

5. An electrical control system comprising:
   means including a full wave rectifier having its alternating current terminals coupled to an alternating current system for producing periodic unidirectional reference pulses having a varying duration between pulses;
   a power source;
   an electrical energy storage device;
   means for discharging the storage device at a preselected rate;
   first transistor switching means connected to receive the reference pulses as an input and having an output circuit connected between the power source and the storage device and being biased to a nonconductive state when the output voltage of said pulse producing means is zero and being biased to a conductive state by said pulses for momentarily connecting the storage device to said power source to charge the storage device to a first preselected level when said transistor switching means is turned off by the voltage zero between said reference pulses;
   a second transistor switching circuit responsive to the level of charge of the storage device to have one output condition when the storage device is charged to the first preselected level and to change to a second output condition when said storage device has discharged to a second preselected level; and
   means responsive to the change of the second switching circuit to its second output condition to produce an output pulse.

6. An electrical control system comprising:
   means for producing periodic reference pulses having a varying duration between pulses;
   a power source;
   a capacitance;
   means for discharging the capacitance at a preselected rate after the capacitance has been charged;
   a first transistor switching circuit connected to receive the reference pulses as an input and having an output circuit connected between the power source and the capacitance, said first switching circuit responsive to each reference pulse regardless of the duration between pulses to momentarily connect the capacitance across the source to charge the capacitance to a first preselected level;

a second transistor switching circuit responsive to the level of charge of the capacitance to have one output condition when the storage device is charge to the first preselected level and to change to a second output condition when said capacitance has discharged to a second preselected level; and means responsive to the change of the second switching means to its second output condition to produce an output pulse.

7. A monostable circuit responsive to periodic reference pulses with varying durations between pulses for producing an output signal a preselected time after each reference pulse, said circuit comprising:

a power source;

a first transistor switching circuit biased on by said reference pulses and connected to momentarily turn off in response to each voltage zero between said reference pulses;

a capacitor connected on one side to the output of the first switching circuit;

a second normally conducting transistor switching circuit having an input terminal connected to the other side of the capacitor, said transistor switching circuits, capacitor and power source connected to charge said capacitor to a first preselected level upon the momentary turning off of the first switching circuit and to apply the charge to the input terminal of the second switching circuit upon the turning on of the first switching circuit;

means for discharging the capacitor at a preselected rate; and said second switching circuit being biased to a nonconducting state by the capacitor charge at the first preselected level upon the turning on of the first switching circuit after said current zero and returning to its conducting state when said capacitor has discharged to a second preselected level lower than said first preselected level.

8. Means for producing an output signal across an output resistance a preselected time after a reference pulse received as an input, said means comprising:

a power source having a first source terminal and a second source terminal;

switching means having a first switch output terminal and a second switch output terminal with said second switch terminal connected to the second source terminal, said switching means normally having a closed circuit condition between its first switch terminal and its second switch terminal;

a first resistance connected between the first source terminal and the first switch terminal;

a transistor having a base, emitter, and collector with said emitter connected to the second source terminal;

said output resistance connected between the first source terminal and the collector;

a capacitance connected between the first switch terminal and the base;

an adjustable resistance means connected between the first source terminal and the base for controlling the rate of discharge of the capacitance; and said switching means responsive to the reference pulse to open a circuit between the first and second switch terminals for a duration sufficient to charge the capacitance to a preselected level through the first resistance and the base-emitter circuit of the transistor.

9. Means for producing an output signal across a load a preselected time after a reference pulse received as an input, said means comprising:

a power source having a positive terminal and a negative terminal;

a transistor switching circuit having a first output electrode and a second output electrode with said second output electrode connected to the positive terminal, said transistor circuit normally having a closed circuit condition between its output electrodes;

a resistance connected between the negative terminal and the first output electrode;

a PNP transistor having a base, emitter, and collector with said emitter connected to the positive terminal;

said load connected between the negative terminal and the collector;

a capacitance connected between the first output electrode and the base;

an adjustable resistance means connected between the negative terminal and the base for controlling the rate of discharge of the capacitance; and said switching means responsive to the reference pulse to momentarily open a circuit between the output electrodes to charge the capacitance to a preselected level.

10. An electric control system for generating an output pulse a preselected time after each reference pulse is received comprising, in combination, a power source, a capacitor, a switching transistor having a base, an emitter, and a collector and receiving said reference pulses in its base-emitter circuit and having its emitter-collector circuit connected in series with a collector resistor across said source of power and its collector connected to one electrode of said capacitor and normally being biased in a nonconducting state and being turned on by said reference pulses and being turned off momentarily at each current zero between said reference pulses, a pulse forming transistor provided with a base, an emitter and a collector and normally biased in a conducting state and having its emitter-collector circuit connected in series with a collector resistor across said source of power and its base connected to the other electrode of said capacitor, and variable resistance means for discharging said capacitor at a preselected rate, said switching transistor being turned off momentarily at each said current zero between reference pulses to charge said capacitor to a first preselected level through its collector resistor and the base-emitter circuit of said pulse forming transistor and said pulse forming transistor being biased off, when said switching transistor again turns on, by said first preselected level of charge on said capacitor and remaining off until said capacitor discharges through said variable resistance means to a second preselected level less than said first preselected level.

11. An electric control system for generating output pulses having a predetermined phase relation to the voltage zeros in an alternating current system comprising, in combination, a full wave rectifier having its alternating current terminals connected to said alternating current system, a switching transistor having its input terminals connected to the direct current terminals of said full wave rectifier and normally being biased in a nonconducting condition and being biased to a conducting condition by the pulses from said full wave rectifier and momentarily being biased off at each current zero between said pulses, a pulse forming transistor normally biased in a conducting state, a capacitor connected between the output circuit of said switching transistor and the input circuit of said pulse forming transistor and being charged to a first preselected level through said pulse forming transistor when said switching transistor cuts off at each said current zero, said pulse forming transistor being biased to a nonconducting state by said first preselected level of charge on said capacitor when said switching transistor again turns on after said current zero, variable impedance means for discharging said capacitor at a selected rate, said pulse forming transistor being held in a nonconducting state until said capacitor discharges through said variable impedance means to a second preselected level lower than said first preselected level, and means connected in the output circuit of said pulse forming transistor for generating an output pulse.

12. A control system in accordance with claim 11 wherein said variable impedance means includes the emitter-collector circuit of a transistor and said variable impedance means normally biases said pulse forming transistor in a conducting state.

13. An electric control system for generating output pulses having a predetermined phase relation to voltage zeros in an alternating current system, comprising, in combination, a full wave rectifier having its alternating current terminals connected to said alternating current system, a capacitor, a power supply, a switching transistor provided with a base, an emitter and a collector and having its base-emitter circuit connected to the direct current terminals of said rectifier and its emitter-collector circuit connected in series with a collector resistor across said power supply and its collector connected to one electrode of said capacitor and normally being biased in a nonconducting state and being turned on by the pulses from said full wave rectifier and being turned off momentarily at each current zero between said pulses, a pulse forming transistor provided with a base, an emitter and a collector and normally biased in a conducting state and having its emitter-collector circuit connected in series with a collector resistor across said power supply and its base connected to the other electrode of said capacitor, variable impedance means for discharging said capacitor at a preselected rate, said switching transistor being turned off momentarily at each current zero between pulses from said rectifier to charge said capacitor to a first preselected level through its collector resistor and the base-emitter circuit of said pulse forming transistor and said pulse forming transistor being biased off, when said switching transistor again turns on, by said first preselected level of charge on said capacitor and being held off until said capacitor discharges through said variable impedance means to a second preselected level lower than said first preselected level, whereby output pulses are produced across the collector resistor of said pulse forming transistor a preselected time after the voltage zeros in said alternating current system.

14. A control system in accordance with claim 13 and including a firing angle control transistor and wherein said variable impedance means includes the emitter-collector circuit of said firing angle control transistor and wherein said variable impedance means normally biases said pulse forming transistor in the conducting state.

15. A control system in accordance with claim 14 and including voltage differentiating means connected across the collector resistor of said pulse forming transistor.

References Cited
UNITED STATES PATENTS
3,114,097   12/1963   Clarke _____ 321—18

MILTON O. HIRSHFIELD, *Primary Examiner.*

D. F. DUGGAN, *Assistant Examiner.*

U.S. Cl. X.R.

307—273; 321—47; 323—22